United States Patent [19]

Thomas et al.

[11] Patent Number: 4,796,972
[45] Date of Patent: Jan. 10, 1989

[54] ILLUMINATED SPOKE MOUNTED REFLECTOR FOR BICYCLES

[76] Inventors: Charles A. Thomas, 632 Gressett St., Petersburg, Va. 23803; William N. Bland, Jr., 578 Roberson St., Petersburg, Va. 23805

[21] Appl. No.: 137,561
[22] Filed: Dec. 24, 1987
[51] Int. Cl.[4] ............................. G02B 5/12; B62J 3/00
[52] U.S. Cl. ........................................ 350/99; 340/87; 340/134
[58] Field of Search .......................... 350/97, 99, 101; 340/84, 87, 98, 134, 135

[56] References Cited

U.S. PATENT DOCUMENTS

| | | | |
|---|---|---|---|
| 1,740,588 | 12/1929 | Hamilton | 350/101 |
| 2,161,842 | 6/1939 | Allison, Sr. | 350/101 |
| 3,894,281 | 7/1975 | Bloomfield | 340/134 |
| 4,037,924 | 7/1977 | May | 350/97 |
| 4,046,098 | 9/1977 | Mancinelli et al. | 350/99 |
| 4,135,229 | 1/1979 | Modurkay | 340/134 |
| 4,140,368 | 2/1979 | Sundahl | 350/97 |
| 4,178,070 | 12/1979 | Thibodeau, Sr. | 350/97 |
| 4,225,848 | 9/1980 | Roberts | 340/87 |
| 4,377,802 | 3/1983 | Ferenc | 350/99 |
| 4,595,904 | 6/1986 | Gosswiller et al. | 350/99 |

*Primary Examiner*—Bruce Y. Arnold
*Assistant Examiner*—Loha Ben
*Attorney, Agent, or Firm*—Jerry T. Kearns

[57] ABSTRACT

A rotary electrical contact assembly is mounted on the axle of a bicycle wheel. The rotary electrical contact assembly provides power from a conventional bicycle generator to light bulbs within reflectors mounted on the spokes of the bicycle wheel. A slidable switch on the rotary electrical contact assembly is connected to a shift cable for remote actuation by a bicycle rider. The switch is utilized to select between a constant illumination of the reflectors and an alternative flashing mode of operation.

9 Claims, 4 Drawing Sheets

ILLUMINATED SPOKE MOUNTED REFLECTOR FOR BICYCLES

BACKGROUND OF THE INVENTION

1. Field of the Invention

The present invention relates to illumination devices, and more particularly pertains to a new and improved illuminated spoke mounted reflector for bicycles. Various types of reflector and lighting devices are available for attachment to bicycles. These various devices have been developed to provide a degree of safety for a bicycle rider after dark. While various reflector devices have been attached to the spokes of a bicycle wheel, these devices depend upon available lighting for operation, and do not afford sufficient illumination to enable the bicycle to be seen at a great enough distance by an automobile driver. In order to provide an enhanced degree of safety for night time bicycle riders, the present invention utilizes a rotary electrical contact assembly for transmitting power from a conventional bicycle generator to illuminated spoke mounted reflectors. In addition to the safety benefits of the present invention, an interesting aesthetic flashing effect may also be achieved.

2. Description of the Prior Art

Various types of illumination devices are known in the prior art. A typical example of such an illumination device is to be found in U.S. Pat. No. 1,740,588, which issued to F. Hamilton on Dec. 24, 1929. This patent discloses a stationary reflector and light for the illumination of a vehicle license plate. U.S. Pat. No. 2,161,842, which issued to W. Allison on June 13, 1939, discloses a stationary illuminated reflector for highway signs. U.S. Pat. No. 4,037,924, which issued to L. May on July 26, 1977, discloses a spoke mounted bicycle reflector. U.S. Pat. No. 4,140,368, which issued to E. Sundahl on Feb. 20, 1979, discloses a bicycle safety reflector which is mounted for rotation on a bicycle hub and a bicycle spoke. Two planar reflectors are attached to opposite sides of a spring metal base plate, the inner end of which has a curved portion forming a spring clip for attachment to the wheel hub and the outer end of which has a laterally protruding spoke clamp which can be crimped onto a spoke. U.S. Pat. No. 4,178,070, which issued to R. Thibodeau, Sr. on Dec. 11, 1979, discloses a spoke mounted bicycle reflector which utilizes a pair of reflector assemblies mounted on opposite sides of a bicycle wheel with the reflective surfaces being transverse to the length of the bicycle. Each assembly has back-to-back reflective surfaces of two selected, different colors, as for example red and amber. When the wheel spins, illumination from the front or rear produces a sharp flashing or stroboscopic effect.

While the above mentioned devices are suited for their intended usage, none of these devices provide an illuminated spoke mounted bicycle reflector. Additionally, none of the aforesaid prior art illumination devices utilize a rotary electrical contact assembly for providing power from a conventional generator to an illuminated spoke mounted reflector. An additional feature of the present invention, not contemplated by the aforesaid prior art devices, is the provision of a rotary electrical contact assembly mounted on the axle of a bicycle wheel and provided with a switch for allowing continuous or intermittent illumination of spoke mounted reflectors. Inasmuch as the art is relatively crowded with respect to these various types of illumination devices, it can be appreciated that there is a continuing need for and interest in improvements to such illumination devices, and in this respect, the present invention addresses this need and interest.

SUMMARY OF THE INVENTION

In view of the foregoing disadvantages inherent in the known types of illumination devices now present in the prior art, the present invention provides an improved illuminated spoke mounted reflector for bicycles. As such, the general purpose of the present invention, which will be described subsequently in greater detail, is to provide a new and improved illuminated spoke mounted reflector for bicycles which has all the advantages of the prior art illumination devices and none of the disadvantages.

To attain this, a representative embodiment of the concepts of the present invention is illustrated in the drawings and makes use of a rotary electrical contact assembly which is mounted on the axle of a bicycle wheel. The rotary electrical contact assembly provides power from a conventional bicycle generator to light bulbs within reflectors mounted on the spokes of the bicycle wheel. A slidable switch on the rotary electrical contact assembly is connected to a cable for remote actuation by a bicycle rider. The switch is utilized to select between a constant illumination of the reflectors and an alternative flashing mode of operation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illuminated spoke mounted reflector for bicycles which has all the advantages of the prior art illumination devices and none of the disadvantages.

It is another object of the present invention to provide a new and improved illuminated spoke mounted reflector for bicycles which may be easily and efficiently manufactured and marketed.

It is a further object of the present invention to provide a new and improved illuminated spoke mounted reflector for bicycles which is of a durable and reliable construction.

An even further object of the present invention is to provide a new and improved illuminated spoke mounted reflector for bicycles which is susceptible of a low cost of manufacture with regard to both materials and labor, and which accordingly is then susceptible of low prices of sale to the consuming public, thereby making such illumination devices economically available to the buying public.

Still yet another object of the present invention is to provide a new and improved illuminated spoke mounted reflector for bicycles which provides in the apparatuses and methods of the prior art some of the advantages thereof, while simultaneously overcoming some of the disadvantages normally associated therewith.

Still another object of the present invention is to provide a new and improved illuminated spoke mounted reflector for bicycles which utilizes a rotary electrical contact assembly to provide electrical power from a conventional bicycle generator to an illuminated spoke mounted reflector.

Yet another object of the present invention is to provide a new and improved illuminated spoke mounted reflector for bicycles which utilizes a rotary electrical contact assembly provided with a switch for selecting continuous or intermittent illumination of a spoke mounted reflector.

Even still another object of the present invention is to provide a new and improved illuminated spoke mounted reflector for bicycles which provides an aesthetic walking image illumination effect.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
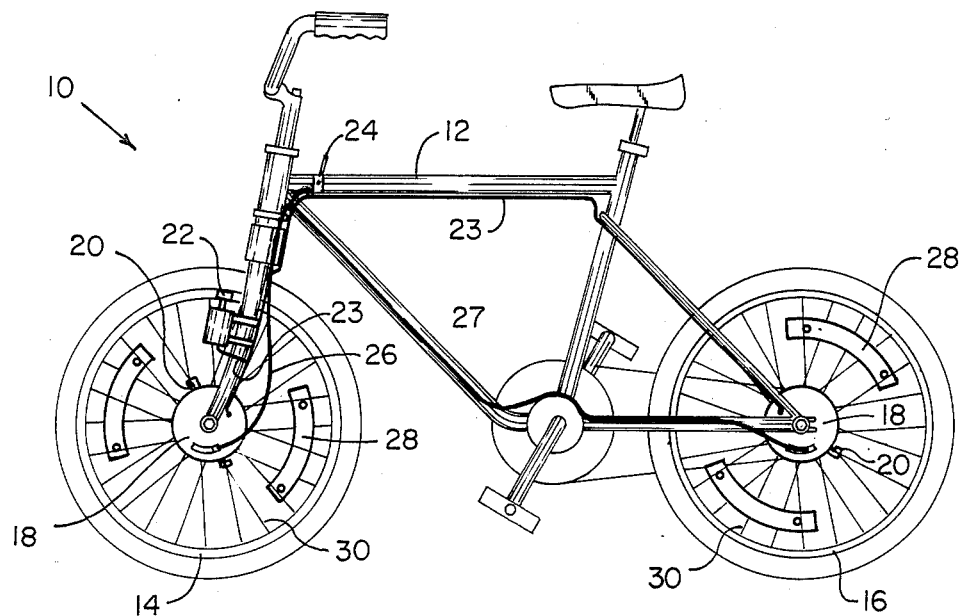
FIG. 1 is a side view of a bicycle provided with the spoke mounted illuminated reflectors of the present invention.

With reference now to the drawings, and in particular to FIG. 1 thereof, a new and improved illuminated spoke mounted reflector for bicycles embodying the principles and concepts of the present invention and generally designated by the reference numeral 10 will be described.

More specifically, it will be noted that the first embodiment of the invention is designed for use with a conventional bicycle 12 having a front wheel 14 and a rear wheel 16. A rotary electrical contact assembly 18 is mounted on the axle of each the wheels 14 and 16. A first portion of each electrical contact assembly 18 is stationary and is secured to the front forks or rear frame of the bicycle 12. A second portion of each electrical contact assembly 18 is mounted for rotation with the hub of the wheel 14 or 16. A pair of spoke clips 20 engage spokes 30 on the wheel 14 or 16, thus, securing a portion of the electrical contact assembly 18 for rotation with the spokes 30. A pair of spoke mounted reflectors 28 are mounted in a conventional fashion on the spokes 30 on each of the wheels 14 and 16. A conventional electric generator 22 is mounted on the frame of the bicycle 12, and is driven by rotation of one of the bicycle wheels 14 or 16. Current supplied by the generator 22 is conducted to each of the rotary electrical contact assemblies 18 by a pair of wires 23. The current is then conducted to light bulbs received in each of the illuminated reflectors 28, in a manner to be subsequently described. A conventional cable type shifter 24 is connected for the concurrent actuation of a pair of conventional shift cables 26 and 27. The cables are connected to the rotary electrical contact assemblies for controlling the mode of operation thereof. In a first mode, the illuminated reflectors 28 will be continuously illuminated, and in a second mode of operation the reflectors 28 will flash intermittently as the wheels 14 and 16 rotate. It should be noted that various conventional forms of batteries may be substituted for the generator 22, without departing from the scope of the present invention.

Figure 2:
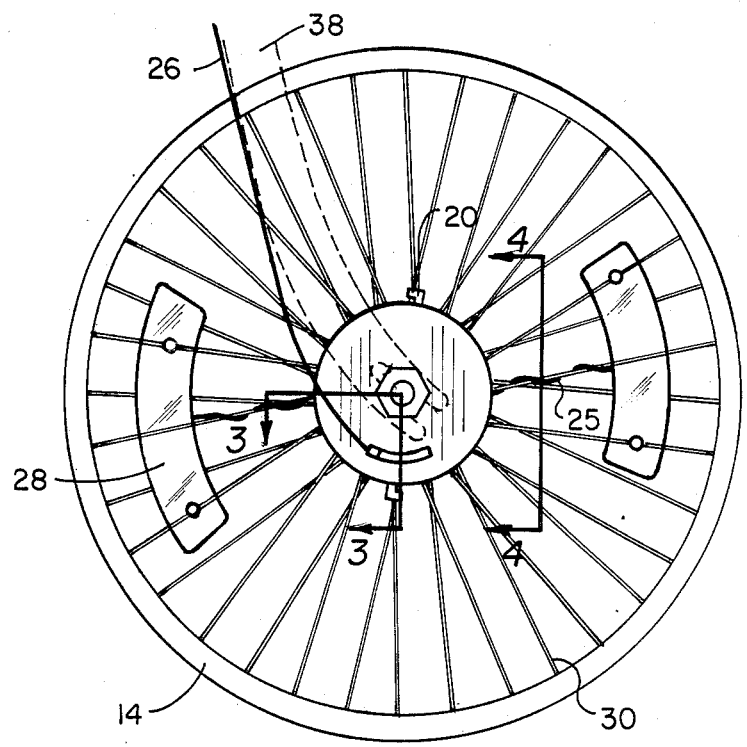
FIG. 2 is a side view of a bicycle wheel incorporating the illuminated spoke mounted reflectors of the present invention.

In FIG. 2, an enlarged detail view of the front wheel 14 of the bicycle 12 is provided. As shown, the rotary electrical contact assembly 18 is mounted on the front axle of the wheel 14 and a portion of the contact assembly 18 is secured for rotation with the spokes 30 by a pair of spoke clips 20. A pair of insulated wires 25 transmit current to light bulbs within each of the reflectors 28. The shift cable 26 is connected for actuation of a switch mechanism in the rotary electrical contact assembly 18 for selecting a continuous or an intermittent operation of the illuminated reflectors 28.

Figure 3:
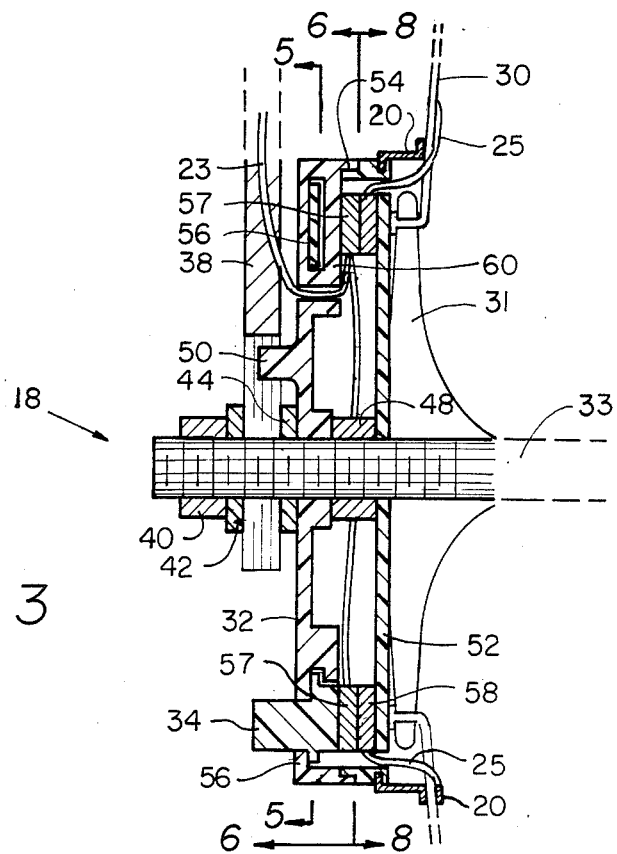
FIG. 3 is a cross sectional view of the rotary electrical contact assembly of the present invention, mounted on the axle of a bicycle wheel.

In FIG. 3, a cross sectional view of the rotary electrical contact assembly 18, taken along line 3—3 of FIG. 2, is provided. A plastic outer plate 32 has a central aperture through which the axle 33 of the front wheel 14 is received. The plate 32 is mounted between the front fork 38 and the wheel hub 31. A conventional nut 40 in combination with conventional washers 42 and 44 are utilized to secure the fork 38 and plate 32 on the axle 33. An outwardly projecting tab 50 on the outer surface of the plate 32 engages the notched end of the fork 38, thus securing the plate 32 against rotation. A second plastic plate 52 is mounted for rotation with the wheel hub 31 through engagement of a pair of spoke clips 20 with the spokes 30 of the wheel 14. A spacing washer 48 separates the stationary plate 32 from the rotary plate 52. A pair of metallic contact arc segments 57 are mounted on the stationary plate 32. The contact arc segments 57 are connected by soldering or other conventional means to a positive lead 23 coming from the generator 22. The negative side of the generator is grounded to the bicycle frame. Thus, by virtue of the plastic material of the plate 32, the contact arc segments 57 are insulated from the negative grounded axle 33. A plastic contact mounting ring 58 is secured for rotation with the plate 52. The ring 58 carries a metallic spring contact which is connected by a pair of wires 25 to light bulbs within the illuminated reflectors 28. The stationary plate 32 and rotary plate 52 are provided with engaging flanged portions 54 which rotate relative to one another and provide a sealing arrangement against the entry of dirt and water. A slidable switch 34 is mounted on the stationary plate 32. The switch 34 serves to rotate a plastic contact mounting ring 56 through a small circular arc. A pair of metallic leaf spring contacts are carried on the ring 56.

Figure 4:
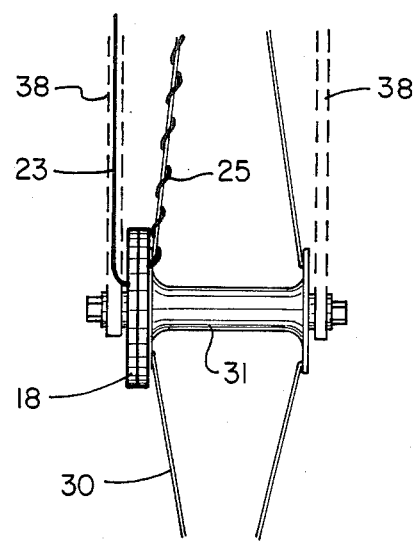
FIG. 4 is a front view of a bicycle hub provided with the rotary electrical contact assembly of the present invention.

With reference now to FIG. 4, a detail view of the bicycle hub 31, illustrating the rotary electrical contact assembly 18 is provided. The electrical contact assembly 18 serves to transmit electrical current from a positive lead 23 connected to the generator 22, to a positive lead 25 connected to light bulbs received within the illuminated reflectors 28.

Figure 5:
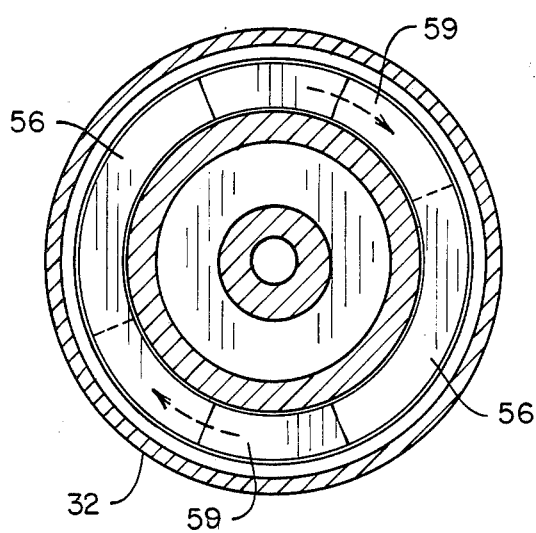
FIG. 5 is a cross sectional view taken along line 5—5 of FIG. 3, illustrating the rotary electrical contact assembly.

With reference now to FIG. 5, a cross sectional view taken along line 5—5 of FIG. 3 is provided. The plastic contact carrier ring 56 carries a pair of small circular arc segment metallic spring contacts 59. The plastic carrier ring 56 and attached contacts 59 are constrained for rotation in a small circular arc as illustrated. The contacts 59 thus may be moved to the positions illustrated by the arrows and dotted lines. The carrier ring 56 is received in an annular track in the plate 32.

Figure 6:
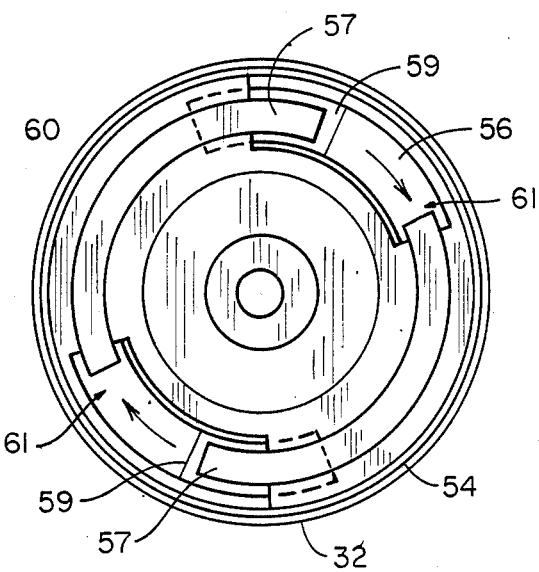
FIG. 6 is a cross sectional view taken along line 6—6 of FIG. 3, illustrating the rotary electrical contact assembly.

In FIG. 6, a cross sectional view of the electrical contact assembly 18, taken along line 6—6 of FIG. 3 is provided. The circular arc segment metallic contacts 57 are mounted on a plastic inner wall 60 of the stationary plate 32. The wall 60 is provided with a pair of diametrically opposed open slots 61. The plastic carrier ring 56 and attached metallic spring contacts 59 may be seen through the slots 61. The carrier ring 56 is thus on the opposite side of the wall 60 from the contact arc segments 57. Due to the spring construction of the contacts 59, the contacts 59 will extend upwardly through the slots 61 into contact with the contact arc segments 57. As may now be understood, the carrier ring 56 may be selectively manipulated so as to cause the contacts 59 to bridge the gaps between the ends of the contact arc segments 57, thus forming a complete circular contact ring. The stepped sealing flange 54 on the stationary plate 32 extends around the outer periphery thereof.

Figure 7:
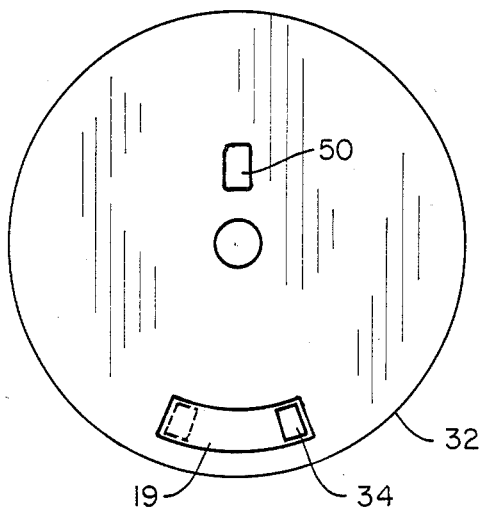
FIG. 7 is a side view of the rotary electrical contact assembly.

In FIG. 7, a front view of the stationary plate 32 is provided. The switch 34 is slidably received in a slot 19 in the outer wall of the plate 32. The switch 34 is attached to the carrier ring 56. Thus, the carrier ring 56 may be rotated back and forth, through a small circular arc by manipulation of the switch 34. In use, the switch 34 is secured to a conventional bicycle shift control type cable for remote manipulation by a bicycle rider.

Figure 8:
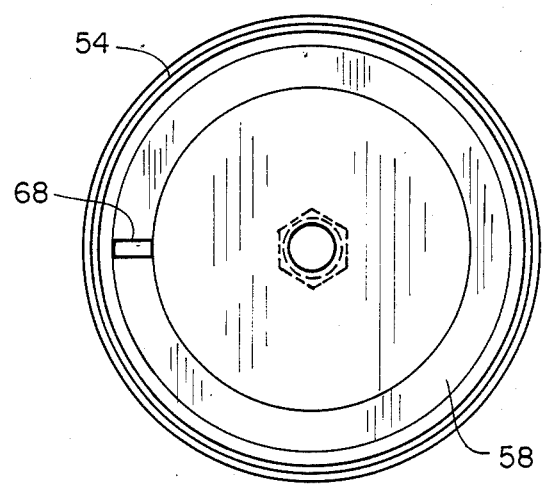
FIG. 8 is a cross sectional view taken along line 8—8 of FIG. 3, illustrating the rotary electrical contact assembly.

In FIG. 8, a cross sectional view taken along line 8—8 of FIG. 3 is provided. The rotary plate 52 carries a plastic contact carrier ring 58. A metallic spring contact 68 is secured to the carrier ring 58 for rotation therewith. The contact 68 is connected by a pair of insulated wires 25 to light bulbs received within the spoke mounted reflectors 28. In operation, the spring metallic contact 68 rides against the metallic contact arc segments 57 on the stationary plate 32. When the carrier ring 56 is adjusted to the position illustrated in FIG. 6, gaps are provided between the ends of the contact arc segments 57. Thus, as the rotary contact 68 passes these gaps, electrical contact will be broken, thus causing the light bulbs in the reflectors 28 to blink off. By rotating the carrier ring 56 to the position illustrated in dotted lines in FIG. 5, the metallic spring contacts 59 will bridge the gaps between the ends of the contact segments 57, thus forming a complete stationary contact ring. In this configuration, the rotary contact 68 will maintain electrical contact with the positive lead 23 from the generator 22 through a complete three hundred sixty degrees circle of rotation, thus constantly illuminating the reflectors 28. As may now be understood, the bicycle rider may select between an intermittent flashing illumination of the reflectors 28 and a continuous illumination by manipulation of the shift lever 24.

Figure 9:
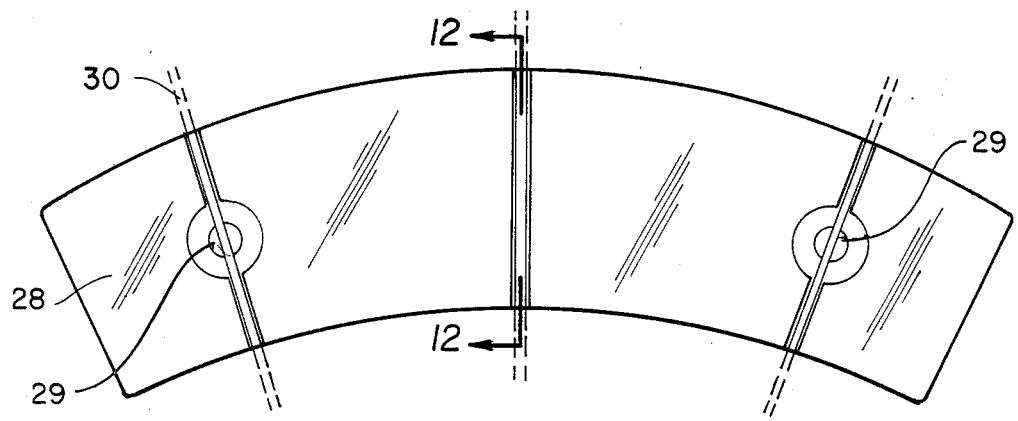
FIG. 9 is a front view of an illuminated spoke mounted reflector according to the present invention.

With reference now to FIG. 9, a detail view is provided, illustrating the spoke mounted reflector 28. The reflector 28 is secured to the spokes 30 in a conventional fashion by a pair of clamp screws 29.

Figure 10:
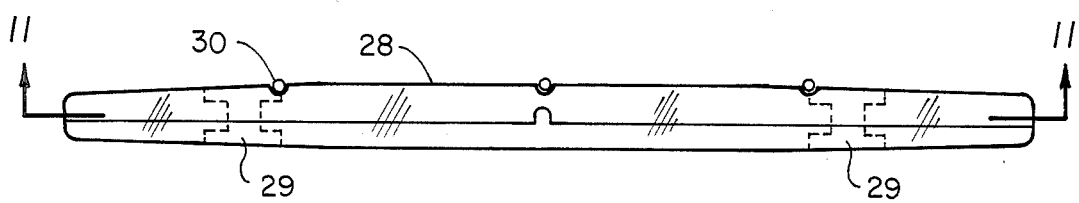
FIG. 10 is a side view of an illuminated spoke mounted reflector according to the present invention.

In FIG. 10, a side view of the spoke mounted reflector 28 is provided.

Figure 11:
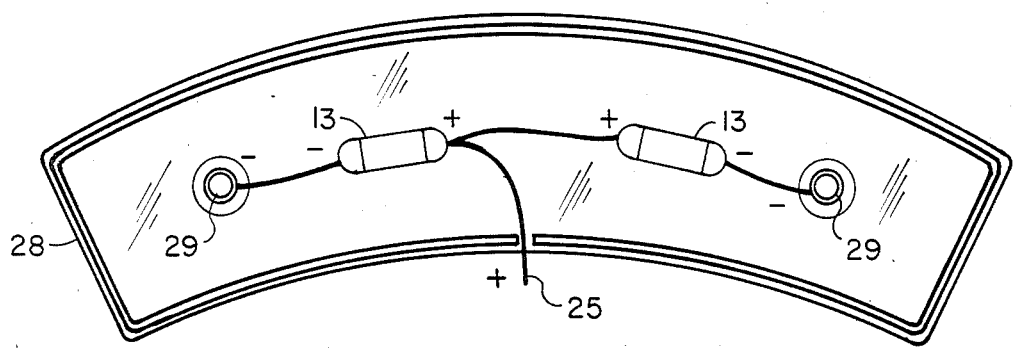
FIG. 11 is a cross sectional view taken along line 11—11 of FIG. 10, illustrating the interior of the illuminated reflector of the present invention.

In the cross sectional view of FIG. 11, the interior of the spoke mounted reflector 28 is illustrated. A pair of light bulbs 13 are connected to a positive lead 25 which is formed by an insulated wire which may be wrapped around one of the spokes 30. The negative terminals of the bulb 13 are grounded to the spokes 30 by the clamp screws 29. Thus, the negative terminals of the bulbs 13 are connected by the spokes 30 to the hub 31 and hence to the negatively grounded bicycle frame.

Figure 12:
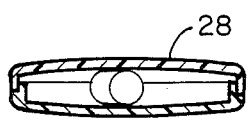
FIG. 12 is a transverse cross sectional view, taken along line 12—12 of FIG. 9, illustrating the illuminated spoke mounted reflector of the present invention.

In FIG. 12, a transverse cross sectional view of the spoke mounted reflector 28 is provided. While the reflector 28 is illustrated with a pair of bulbs 13, a single bulb or as many bulbs as desired may be utilized.

While the rotary electrical contact assembly 18 has been described utilizing two circular arc segment contacts 57, it is contemplated that the contact arc segments 57 may be further subdivided to increase the flashing frequency. Alternatively, the arc segments 57 may be formed as a complete circular ring, omitting the selective switched flashing option. These and other alternatives are considered to fall within the broad scope of the invention which is directed to the provision of a rotary electrical contact assembly on an axle of a bicycle wheel for illuminating spoke mounted reflectors.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illuminated, spoke-mounted reflector for bicycles, each having a frame, and a pair of spoked wheels mounted for rotation on said frame by a pair of axles, the improvement comprising:
   means for supplying an electrical current mounted on said frame;
   electrically illuminated reflector means mounted on spokes of at least one of said wheels;
   rotary electrical contact means mounted on at least one of said axles for supplying electric current to said reflector means; and
   said rotary electrical contact means including switch means for both selectively intermittently flashing said illuminated reflector means and for continuously illuminating said reflector means.

2. The illuminated spoke mounted reflector for bicycles of claim 1, wherein said electrical current supplying means comprises a generator.

3. The illuminated spoke mounted reflector for bicycles of claim 1, wherein said electrical current supplying means comprises battery means.

4. The illuminated spoke mounted reflector for bicycles of claim 1, further comprising shift cable means secured on said frame for remotely actuating said switch means.

5. The illuminated spoke mounted reflector for bicycles of claim 1, wherein said electrical current supply means has a negative terminal electrically grounded to said frame.

6. The illuminated spoke mounted reflector for bicycles of claim 1, wherein said rotary electrical contact means comprises stationary electrical contact means secured against rotation to said frame and rotary electrical contact means mounted for rotation with at least one of said wheels.

7. The illuminated spoke mounted reflector for bicycles of claim 1, wherein said illuminated reflector means comprise elongated hollow reflectors having interior light bulb means.

8. The illuminated spoke mounted reflector for bicycles of claim 7, wherein said reflector light bulb means has a negative terminal grounded to said spokes and a positive terminal connected to said rotary electrical contact means.

9. An illuminated reflector system for bicycles, each having a frame and a pair of spoked wheels mounted for rotation on said frame by a pair of axles, said system comprising:
   means on said frame for supplying an electrical current;
   a negative terminal of said electrical current supply means electrically grounded to said frame;
   a stationary plate formed from a non-conducting material and having a central aperture for engagement with one of said axles;
   a non-conducting carrier ring mounted on said stationary plate for rotation through a limited circular arc;
   a pair of diametrically opposed metallic spring contacts carried on said carrier ring;
   a pair of circular arc segment metallic contacts mounted on said stationary plate, overlying said carrier ring;
   switch means slidably mounted on said stationary plate for selectively rotating said carrier ring and connecting said circular arc segment contacts;
   shift cable means secured on said frame for remotely actuating said switch means;
   means connecting said circular arc segment contacts with a positive terminal of said electrical current supply means;
   a rotary plate formed from a non-conducting material and having a central aperture for engagement with one of said axles;
   a rotary carrier ring mounted for rotation on said rotary plate;
   a metallic spring contact secured on said rotary carrier ring adapted to engage said circular arc segment contacts mounted on said stationary plate;
   spoke clip means on said rotary plate for securing said rotary plate for rotation with one of said wheels;
   reflector means including light bulb means mounted on the spokes of at least one of said wheels;
   a negative terminal of said light bulb means being electrically grounded to said spoke; and
   a positive terminal of said light bulb means connected to said metallic spring contact secured on said rotary carrier ring.

* * * * *